United States Patent
Beranek

(10) Patent No.: US 9,583,977 B1
(45) Date of Patent: Feb. 28, 2017

(54) BACK-UP LAMP LIGHT SYSTEM

(71) Applicant: Crystal Beranek, Chandler, AZ (US)

(72) Inventor: Crystal Beranek, Chandler, AZ (US)

(73) Assignee: Crystal Beranek Enterprises LLC, Chandler, AZ (US)

( * ) Notice: Subject to any disclaimer, the term of this patent is extended or adjusted under 35 U.S.C. 154(b) by 358 days.

(21) Appl. No.: 14/260,322

(22) Filed: Apr. 24, 2014

Related U.S. Application Data

(60) Provisional application No. 61/818,814, filed on May 2, 2013.

(51) Int. Cl.
*H02J 9/06* (2006.01)

(52) U.S. Cl.
CPC .................... *H02J 9/065* (2013.01)

(58) Field of Classification Search
None
See application file for complete search history.

(56) References Cited

U.S. PATENT DOCUMENTS

| | | | |
|---|---|---|---|
| 2,863,038 A | 10/1956 | Lombardo | |
| 3,233,091 A | 2/1966 | Hunt | |
| 4,177,500 A | 12/1979 | Nicholl et al. | |
| 4,502,102 A * | 2/1985 | Phipps | F21L 4/005 362/183 |
| 4,611,264 A | 9/1986 | Bradley | |
| 4,631,649 A | 12/1986 | McCue et al. | |
| 4,682,078 A | 7/1987 | Pascalide | |
| 4,985,661 A * | 1/1991 | Lin | F21S 6/003 315/154 |
| 5,467,258 A | 11/1995 | Bamber et al. | |
| 5,548,494 A | 8/1996 | Blackman | |
| 5,763,872 A | 6/1998 | Ness | |
| 5,806,961 A * | 9/1998 | Dalton | F21L 4/025 362/183 |
| 6,010,228 A | 1/2000 | Blackman et al. | |
| 7,938,555 B1 * | 5/2011 | Kalhofer | F21L 4/08 307/66 |
| 2001/0033481 A1 | 10/2001 | Chien | |
| 2005/0088100 A1 * | 4/2005 | Chen | H02J 7/0029 315/86 |
| 2005/0237734 A1 | 10/2005 | Krieger | |

(Continued)

FOREIGN PATENT DOCUMENTS

| CN | 201259116 Y | * | 6/2009 | |
|---|---|---|---|---|
| CN | 201351830 Y | * | 11/2009 | ............. F21S 6/002 |

*Primary Examiner* — Charlie Y Peng
(74) *Attorney, Agent, or Firm* — Invention To Patent Services; Alex Hobson

(57) ABSTRACT

A back-up lamp light system has a portable light that is configured to be detachably attached to a lamp and is configured to automatically turn on in the event of a power outage. The portable light is configured to be retained by a mounting bracket to a lamp. The portable light may be detached from the mounting bracket and used as a flashlight. A portable light has a main light and a night light configured on opposing ends of the portable light. A back-up lamp light system may have a light level sensor that is configured to automatically turn on the nightlight in the event of a light level being detected below a threshold value. A back-up lamp light system may be portable and have a separate power cord or may be integral and have a power cord that extends through the interior of a lamp.

19 Claims, 13 Drawing Sheets

(56) References Cited

U.S. PATENT DOCUMENTS

| | | | |
|---|---|---|---|
| 2006/0146527 A1 | 7/2006 | VanderSchuit | |
| 2009/0072970 A1 | 3/2009 | Barton | |
| 2010/0039792 A1* | 2/2010 | Meyers | F21L 2/00 |
| | | | 362/20 |
| 2011/0193482 A1* | 8/2011 | Jones | H05B 37/04 |
| | | | 315/87 |
| 2013/0033609 A1* | 2/2013 | Cadeus | H04N 5/907 |
| | | | 348/207.1 |
| 2013/0194789 A1 | 8/2013 | Vargas | |
| 2013/0334881 A1 | 12/2013 | Jones | |
| 2015/0159825 A1* | 6/2015 | Flynn | F21S 9/02 |
| | | | 362/183 |

* cited by examiner

BACK-UP LAMP LIGHT SYSTEM

CROSS REFERENCE TO RELATED APPLICATIONS

This application claims the benefit of U.S. provisional patent application No. 61/818,814, filed on May 2, 2013 and entitled LAMP-ATTACHABLE EMERGENCY LIGHT of which the entirety is incorporated herein by reference.

BACKGROUND OF THE INVENTION

Field of the Invention

The present invention relates to a back-up lamp light system comprising a portable light that is configured to be detachably attached to a lamp, and configured to automatically turn on when there is a power outage.

Background

In the event of a power outage, most residents scramble to find a flashlight, which is the most common back-up or emergency light source. A flashlight is often stored in a kitchen or garage. Attempting to locate and turn on the flashlight can be frustrating and dangerous, as the resident has to navigate through the home in the dark.

Most lamps have a single light setting but, in some cases, a lower light setting is desired. For example, when a baby wakes up in the middle of the night and needs a diaper changed, it may be desirable to have a lower level of light. In addition, most lamps have a single bulb that emits light substantially uniformly from around the bulb. In some cases, it may be desirable to have a light emitted in a downward direction from the lamp to allow safe navigation at a lower light setting.

SUMMARY OF THE INVENTION

The invention is directed to a back-up lamp light system comprising a portable light that is configured to be detachably attached to a lamp. A mounting bracket may be configured to attach to a lamp, such as to the rod of the lamp, and secure the portable light thereto. In another embodiment, a lamp is configured with an integral mounting bracket that is part of the lamp and provides an attachment for the portable light. An integral mounting bracket may be permanently attached to a lamp, wherein the lamp and mounting bracket are a one-piece unit. In an exemplary embodiment, the portable light comprises a main light and a nightlight. In one embodiment, the main light is configured on a first end of the portable light and the nightlight is configured on a second end, whereby the main light and nightlight are configured to emit light in substantially opposing directions. When the portable light is coupled to a lamp, the main light may be configured in an up orientation and the nightlight may be configured in a down orientation. A user may turn on the nightlight to emit light in a downward direction and turn on the main light to emit light in an upward direction.

The back-up lamp light system, as described herein, comprises a power source detector that is electrically coupled with the portable light. In the event of a power outage, the power source detector detects the power outage and at least one of the main light or the nightlight is configured to automatically turn on. This feature provides emergency or back-up light in locations where a person is accustom to having a light source. Therefore, a resident will have sufficient light to navigate through their home in the event of a power outage. If a home is outfitted with the back-up lamp light system as described herein, a power outage will not result in an unsafe situation. In an exemplary embodiment, the back-up lamp light system is configured to receive electrical power from a power cord that is plugged into an electrical outlet. The power source detector is configured to monitor the power, such as by voltage or current, from the electrical outlet, and activate a light of the portable light if an outage is detected. A power outage, as used herein, is a loss of electrical power, such as voltage, to an electrical outlet having a power cord that electrical couples said electrical outlet with the portable light plugged therein.

A portable light, as described herein, comprises one or more batteries that enable the light to function as a flashlight when it is detached from the mounting bracket. A battery may be a rechargeable battery. Any suitable means of charging the rechargeable battery may be employed. The power cord that is plugged into an electrical outlet may terminate in a charger plug that is configured to plug into a portable light directly, or into the mounting bracket. A charger plug may be configured to be detachable from the portable light or mounting bracket. A mounting bracket may be configured with a charging feature that is adapted to couple with a charger adapter configured on a portable light. In this embodiment, a portable light may receive electrical power to charge the rechargeable batteries through the charger adapter when the portable light is attached to the mounting bracket. A charging feature and adapter may be configured to physically couple, such as by a plug and aperture, or they may be configured as contacts. In another exemplary embodiment, the charging feature is an inductive charger that is configured to charge the rechargeable battery when the portable light is coupled with the mounting bracket. An inductive charger may allow for easier attachment of the portable light to the mounting bracket, as alignment of the charger with a charging feature may not be necessary. In still another embodiment, a back-up lamp light system comprises a USB adapter, whereby the rechargeable batteries of the portable light can be charged through the USB adapter. As with the power cord, a USB adapter may be configured in a portable light or a mounting bracket. In an exemplary embodiment, a USB adapter is configured on the portable light, thereby making it possible to charge the portable light in a car or through a computer, for example.

A back-up lamp light system, as described herein, may comprise a separate power cord from a lamp power cord that is configured to extend from the portable light or mounting bracket to an electrical outlet. As described, this separate power cord may be detachable, thereby enabling the portable light or the mounting bracket to be separated from the power cord.

In another embodiment, the back-up lamp light system is an integral back-up lamp light system wherein the power cord that provides power to the portable light extends through an interior of a lamp. An integral back-up lamp light system may further comprise an integral mounting bracket. In some cases, a lamp is plugged into an electrical outlet that is controlled by a switch, such as a wall switch. Depending on the wiring of the switch and outlet, the power to the outlet may be terminated when the switch is in an off position. In this situation, a power source detector coupled with this outlet would detect a power outage every time the switch is in the off position. In most homes, a light switch is configured to operate only one of two outlets in an standard outlet box, thereby leaving one of the outlets active, "hot", even when the switch is turned off. Therefore, in one embodiment, an integral back-up lamp light system may be configured with a secondary plug, or back-up light power plug, that can be plugged into the hot outlet when the lamp power plug is plugged into the switch activated outlet. In this way, the lamp can be controlled by the switch, and the power source detector will accurately detect a power outage and automatically turn on the main or nightlight of the portable light when there is a power outage.

In an exemplary embodiment, only the nightlight is configured to turn on in the event of a power outage. In another embodiment, only the main light is configured to turn on in the event of a power outage. In still another embodiment, both the main light and nightlight are configured to turn on in the event of a power outage.

In one embodiment, the back-up lamp light system comprises a light sensor that is configured to monitor a light level. In an exemplary embodiment, the back-up lamp light system is configured to turn on the main light and/or nightlight when a low light level is detected by the light sensor. A threshold light level may pre-set or may be set by a user with a light level input feature. In a preferred embodiment, the nightlight is activated when a light level below a threshold light level is detected by the light sensor, thereby providing some light for safe navigation. A light sensor may be configured on the mounting bracket, portable light, along the power cord, proximal to a plug or on a charger module. In a preferred embodiment, a light sensor is configured on a mounting bracket or portable light, wherein the sensor is better oriented for exposure to surrounding light and thereby activates the nightlight to come on more effectively.

In an exemplary embodiment, the portable light has an elongated shape having a length and cross-dimensional distance, such as a cylindrical shape having an outer diameter. A portable light may have an aspect ratio of length to cross-dimensional distance of about two or more, about four or more, about six or more and the like. As described, an exemplary portable light has a main light configured proximal to a first end and a nightlight configured proximal to a second end. The main light may be configured to direct or emit a light substantially from the first end, or substantially from the first end while the nightlight may be configured to emit light substantially from the second end.

A portable light, as described herein, may comprise any suitable type of light source including incandescent, fluorescent, halogen, light emitting diodes (LED), combinations of these light sources and the like. Light emitting diodes may be a preferred light source as they provide a high light intensity or lumens with lower levels of power. In an exemplary embodiment, the main light and/or nightlight is configured with light output or light intensity settings including, on, off, a low control setting, a medium control setting and a high control setting. In an exemplary embodiment, the main light comprises a low, medium and high control setting, thereby allowing a user to set a desired light output level. As described, a user may use a low or medium setting when changing a baby's diaper in the middle of the night, for example. In the event of a power outage, any of the light output settings may be activated. A portable light may have an on/off switch and a separate main light and nightlight controller. In one embodiment, a nightlight has an on/off switch and an auto setting, whereby the nightlight comes on automatically when there is a low level of light detected by a light sensor. In an exemplary embodiment, the main light has a low, medium and high light control setting, and in some embodiments, an off setting. The control features may be switches or knobs with one or more locational set points, or they may be buttons that toggle through the various settings. For example, a main light may be controlled by a push button control feature that toggles the main light from off to on at a low light output setting with a first pressing of the button, from the low light output setting to a medium light output setting with a second pressing of the button, from the medium light output setting to a high light output setting with a third pressing of the button, and from the high output light setting to off with a fourth pressing of the button.

The mounting bracket, as described herein, may be a detachable mounting bracket that comprises a portable light retainer portion and a coupler portion. The portable light retainer portion is configured to couple with a portable light and retain the portable light to the mounting bracket. The coupler portion of the mounting bracket is configured to couple to a lamp, such as a lamp post or rod, and may comprise any suitable type of detachable coupling feature including, but not limited to, a clamp, a bracket, a strap, a buckle, and the like. In an exemplary embodiment, the coupler portion is configured to enable the mounting bracket to be coupled to a range of lamp rod sizes or diameters including, but not limited to, about 0.5 inches in diameter or more, about 1.0 inch in diameter or more, about 2.0 inches in diameter or more, about 4.0 inches in diameter of more and any range between and including the sizes provided. In an exemplary embodiment, a coupler portion is configured specifically to couple to a cylindrical rod and comprises a curved portion adapted to conform to a cylindrical shape. In one embodiment, a coupler portion is configured to extend around a rod to form an aperture wherein a rod extends therethrough.

The portable light may be detached from the mounting bracket and used as a flashlight, wherein the main light is configured to emit light substantially from a first end of the portable light. The portable light may be detached and set in any location to provide a light source, such as when camping, wherein the light may be used in the nightlight or main light setting. The portable light may be configured to be freestanding, wherein the light can stand in a vertical position when placed on a first or second end. In another embodiment, a portable light and mounting bracket may be detached from a lamp and coupled to an auxiliary location, such as an umbrella post, or rod, or any other suitable location. Many outdoor tables are configured with an umbrella having a post that extends down through the table top. The mounting bracket and portable light may be configured to attach to the umbrella rod thereby enabling outdoor use.

The back-up lamp light system, as described herein, enables a unique method of providing back-up light in the event of a power outage. Any embodiment of a back-up lamp light system, as described herein, may be configured on a lamp. A portable light may be configured into the mounting bracket and a power cord that is coupled with the portable light may be plugged into an outlet. When said power source detector detects a power outage, the main light and/or the nightlight is configured to automatically turn on, thereby providing back-up light to a lamp.

The summary of the invention is provided as a general introduction to some of the embodiments of the invention, and is not intended to be limiting. Additional example embodiments including variations and alternative configurations of the invention are provided herein.

BRIEF DESCRIPTION OF THE DRAWINGS

The accompanying drawings are included to provide a further understanding of the invention and are incorporated

DETAILED DESCRIPTION OF THE ILLUSTRATED EMBODIMENTS

Figure 1:
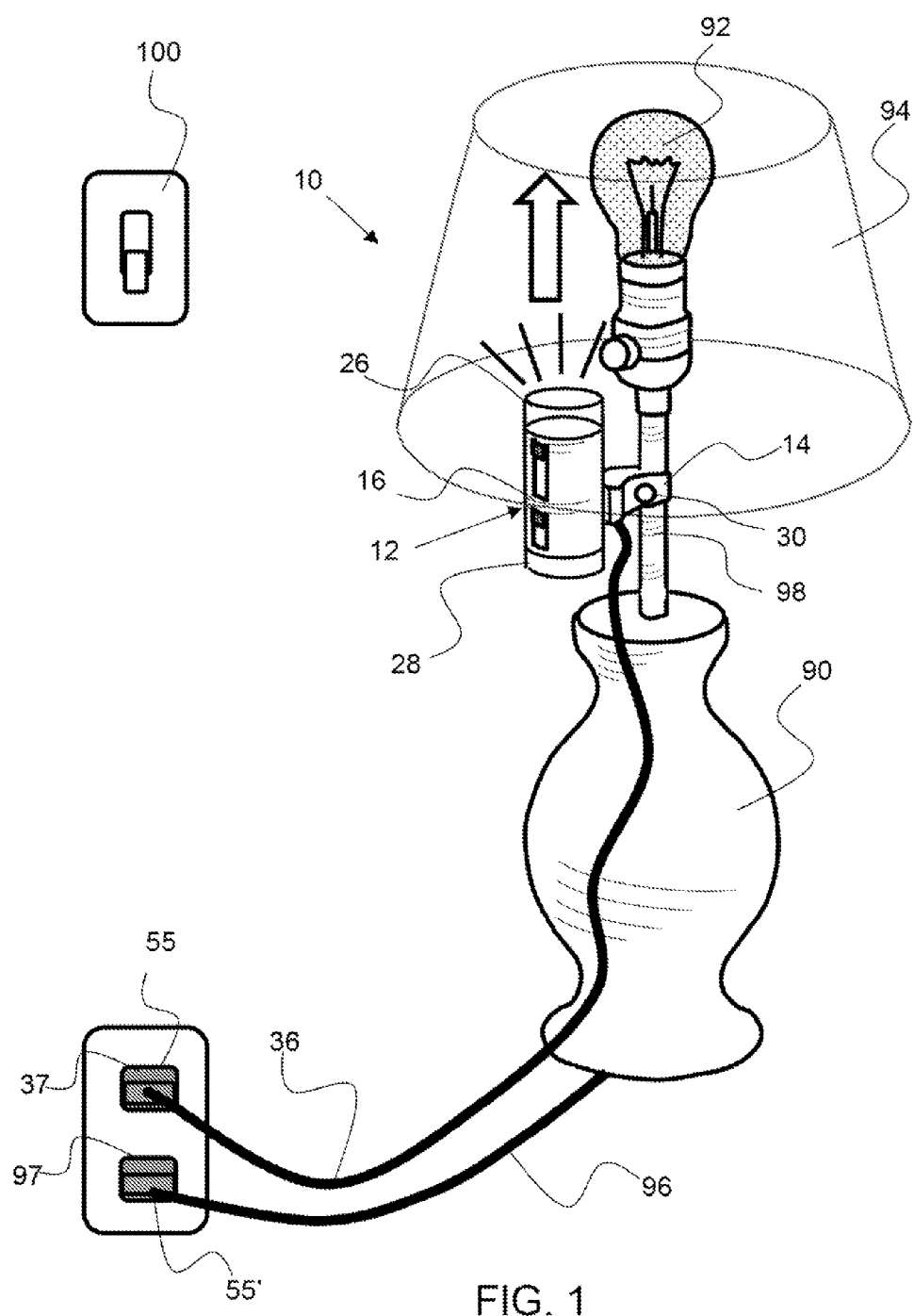

FIG. 1 shows a perspective view of an exemplary back-up lamp light system comprising a detachable portable light configured in a mounting bracket attached to the lamp rod.

Figure 2:
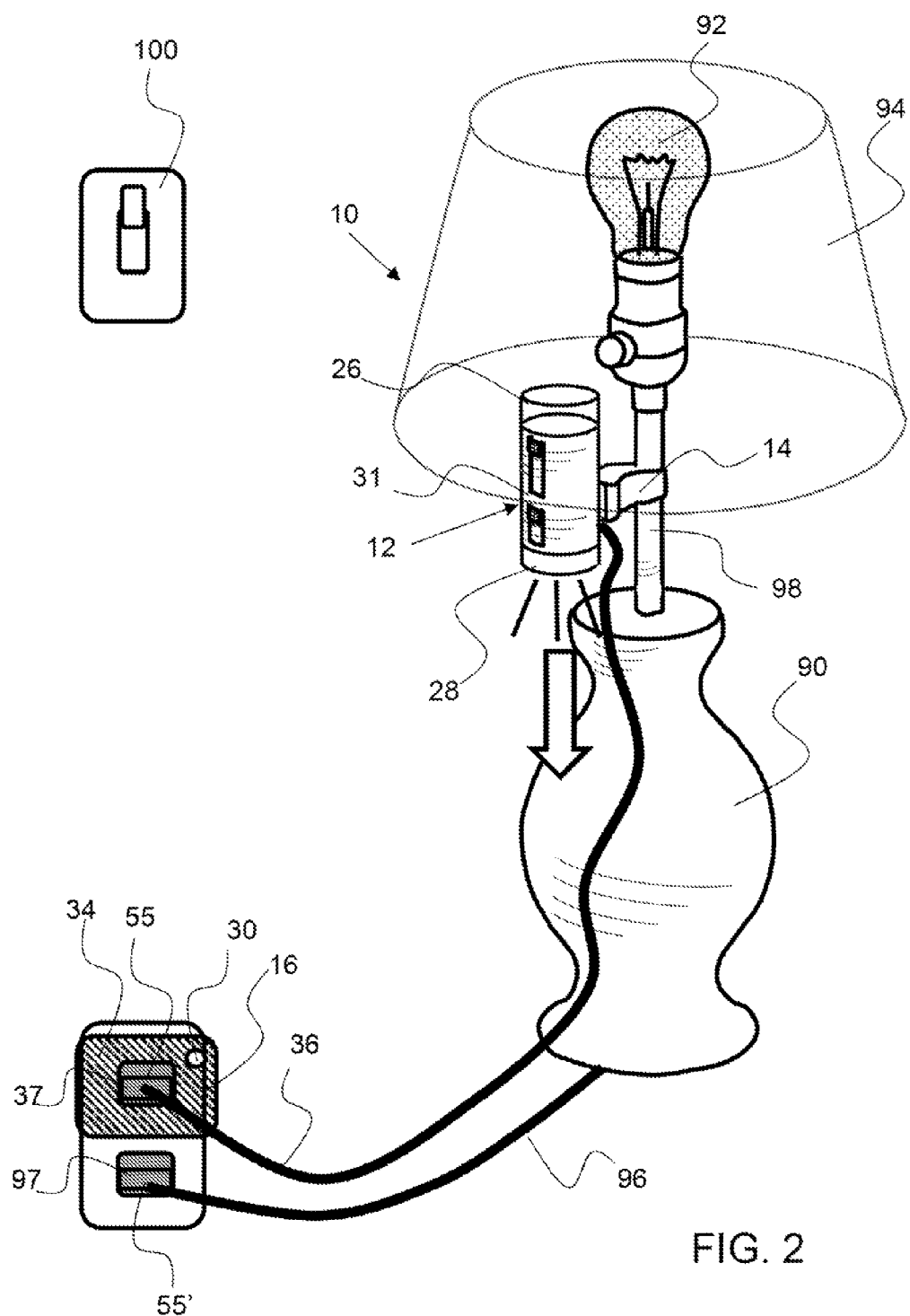

FIG. 2 shows a perspective view of an exemplary back-up lamp light system comprising a detachable portable light configured in a mounting bracket attached to the lamp rod and a charger module plugged into an electrical outlet.

Figure 3:
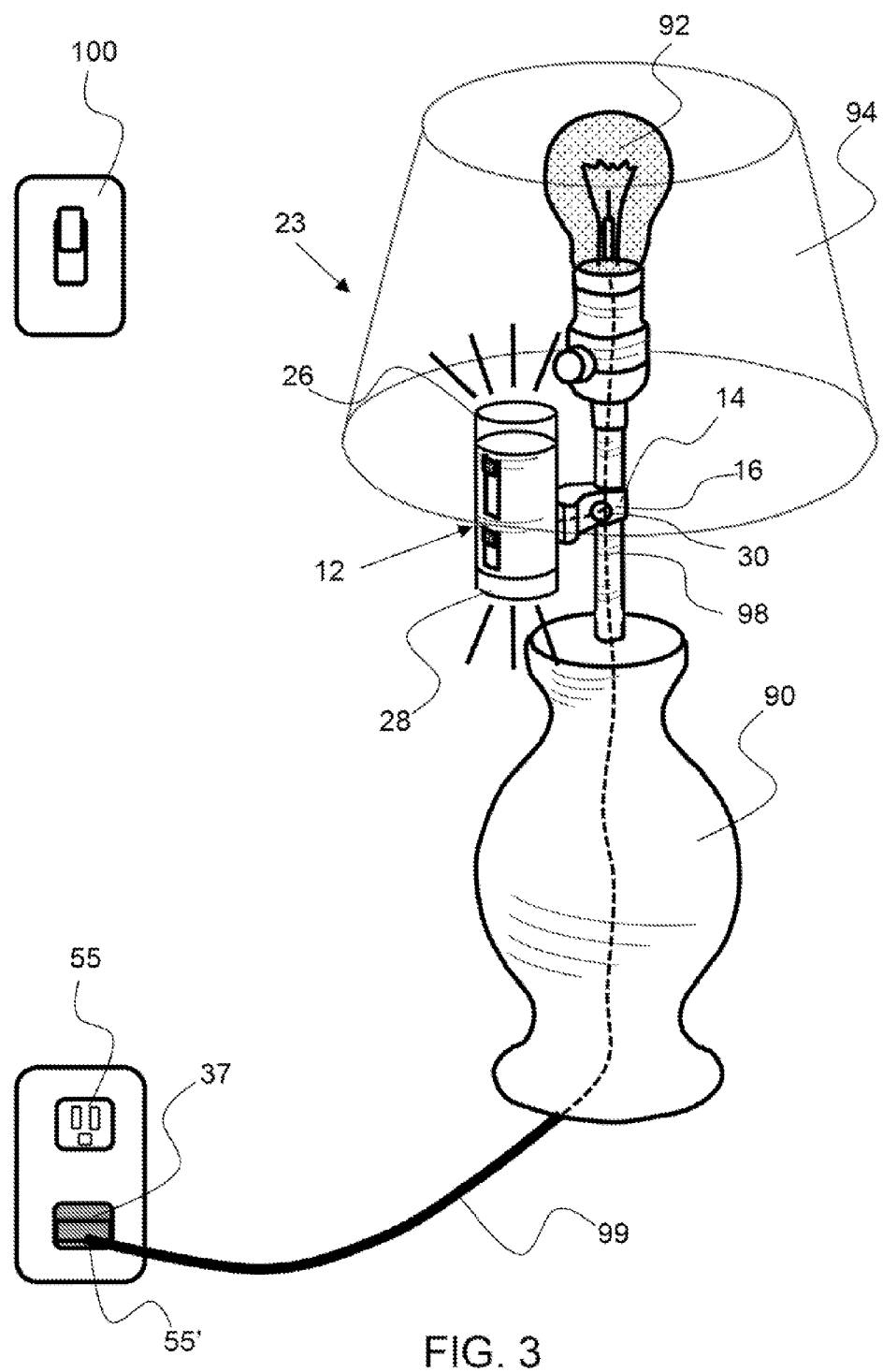

FIG. 3 shows a perspective view of an exemplary integral back-up lamp light system comprising a detachable portable light configured in a mounting bracket and a single electrical power cord.

Figure 4:
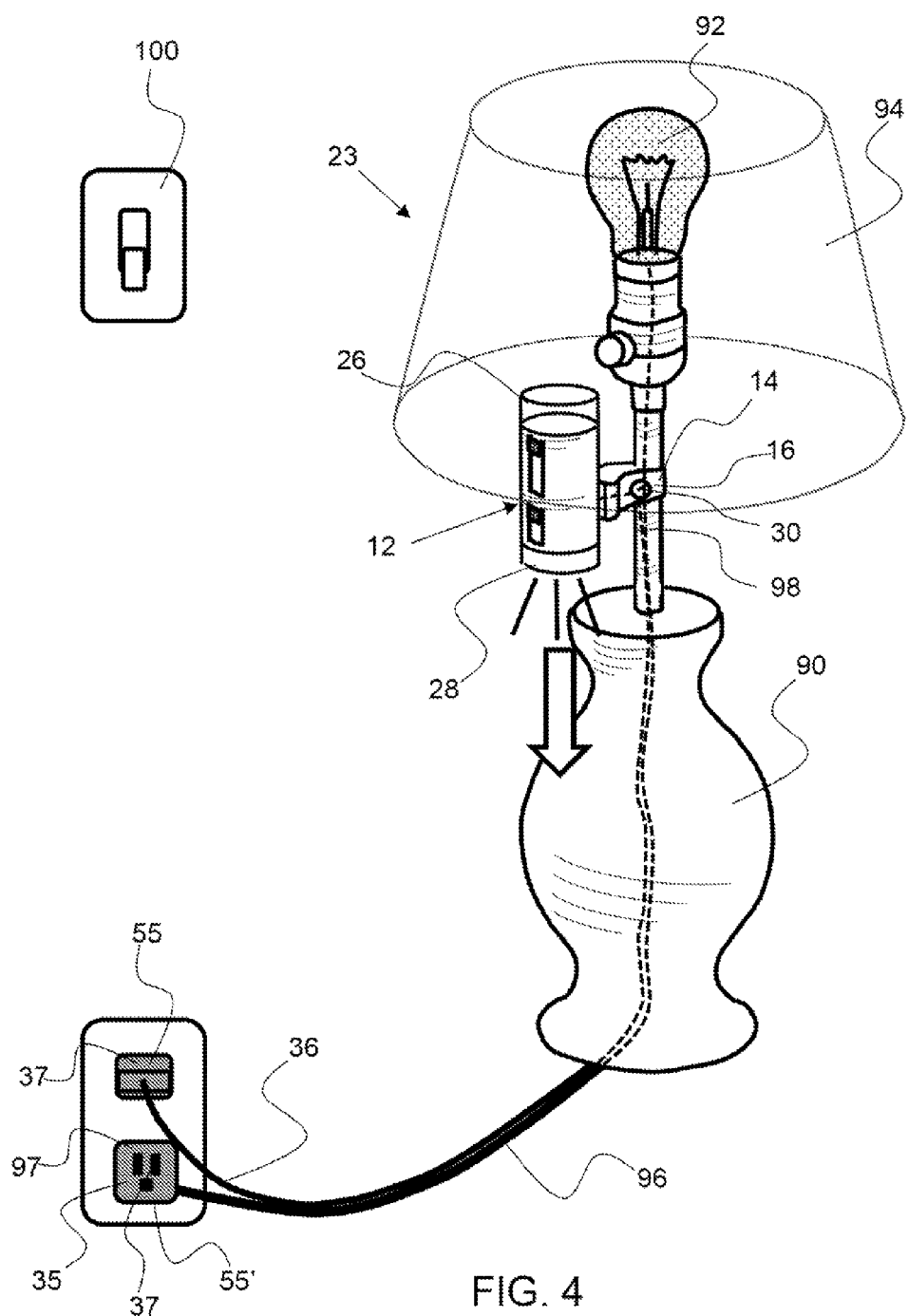

FIG. 4 shows a perspective view of an exemplary integral back-up lamp light system comprising a detachable portable light configured in a mounting bracket and two distinct power plugs extending from the lamp.

Figure 5:
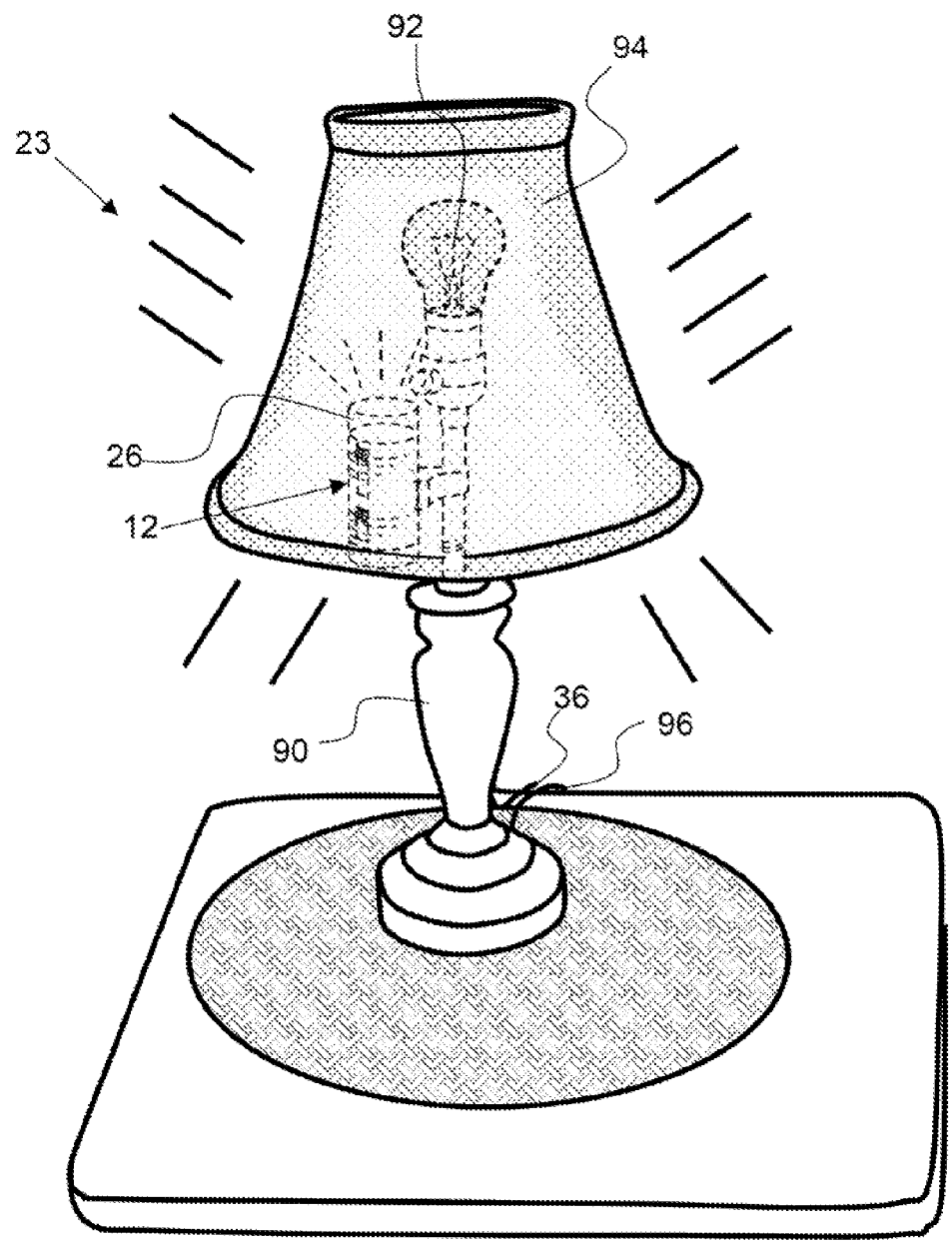

FIG. 5 shows a perspective view of an exemplary integral back-up lamp light system comprising a detachable portable light configured in a mounting bracket and attached to a lamp substantially under the lampshade.

Figure 6:
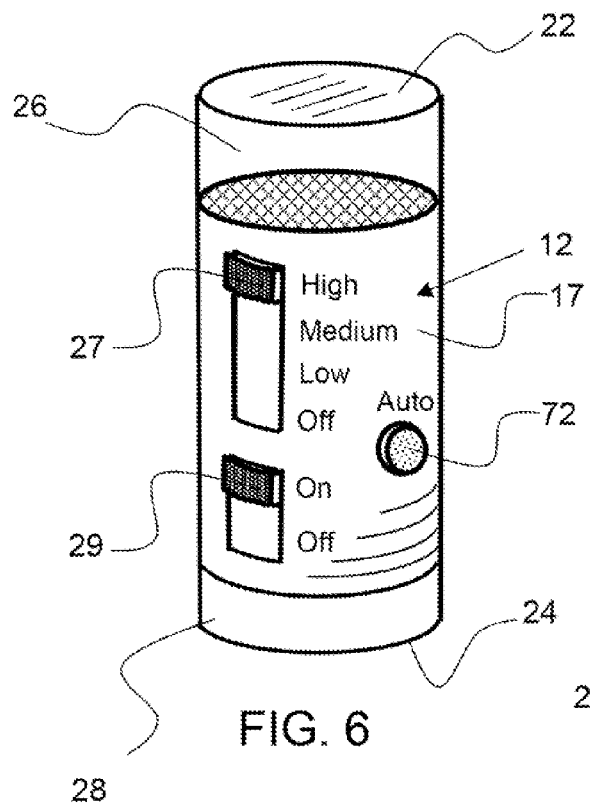

FIG. 6 shows a perspective view of an exemplary detachable portable light having a main light and a nightlight configured on opposing ends of the portable light and both a main light control and nightlight control.

Figure 7:
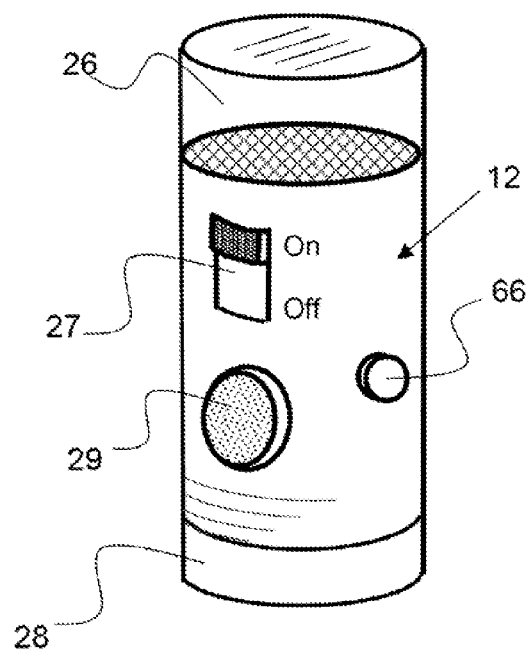

FIG. 7 shows a perspective view of an exemplary detachable portable light having a main light, a nightlight, and both a main light control switch and nightlight control button.

Figure 8:
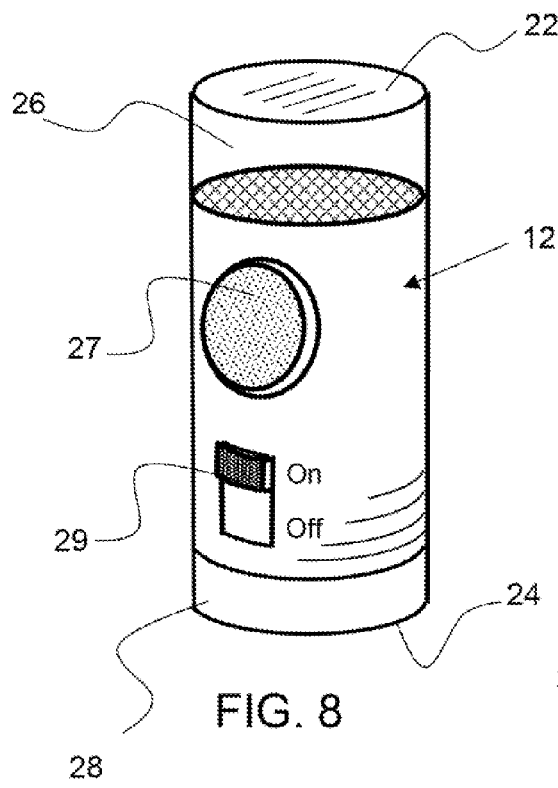

FIG. 8 shows a perspective view of an exemplary detachable portable light having a main light, a nightlight and both a main light button and nightlight switch.

Figure 9:
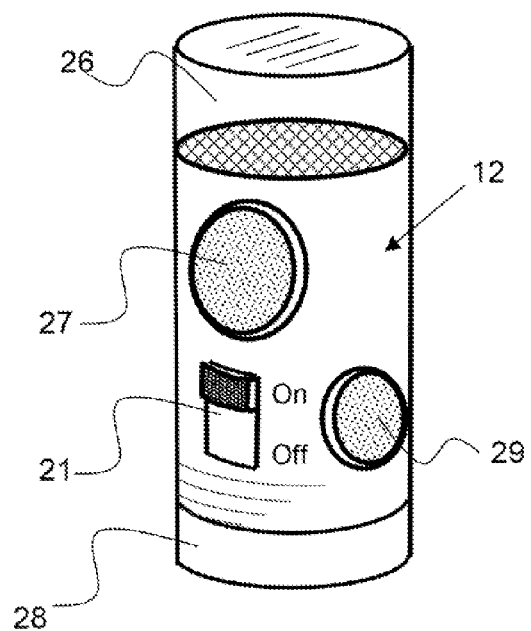

FIG. 9 shows a perspective view of an exemplary detachable portable light having a main light control button, a nightlight control button and an on/off switch.

Figure 10A:
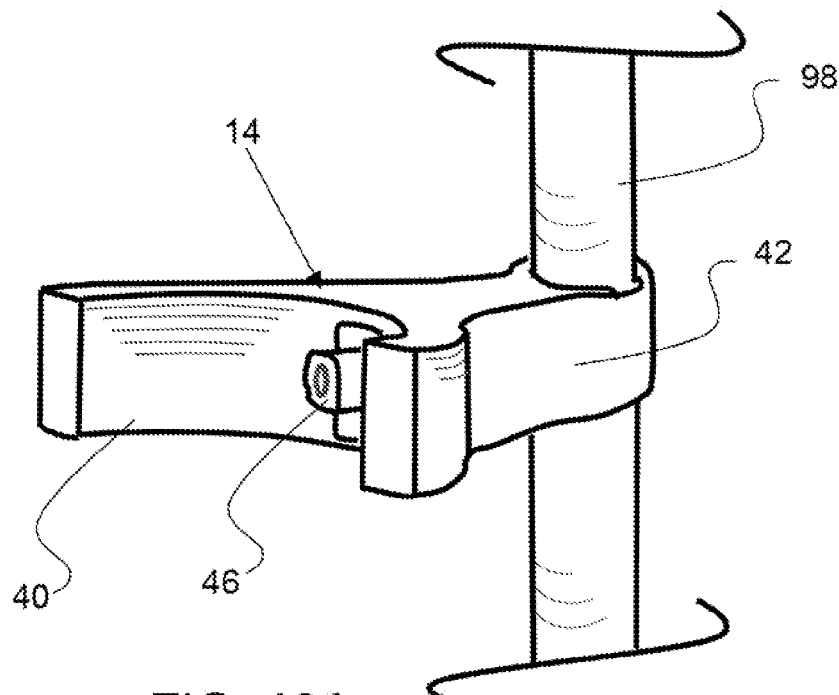
Figure 10B:
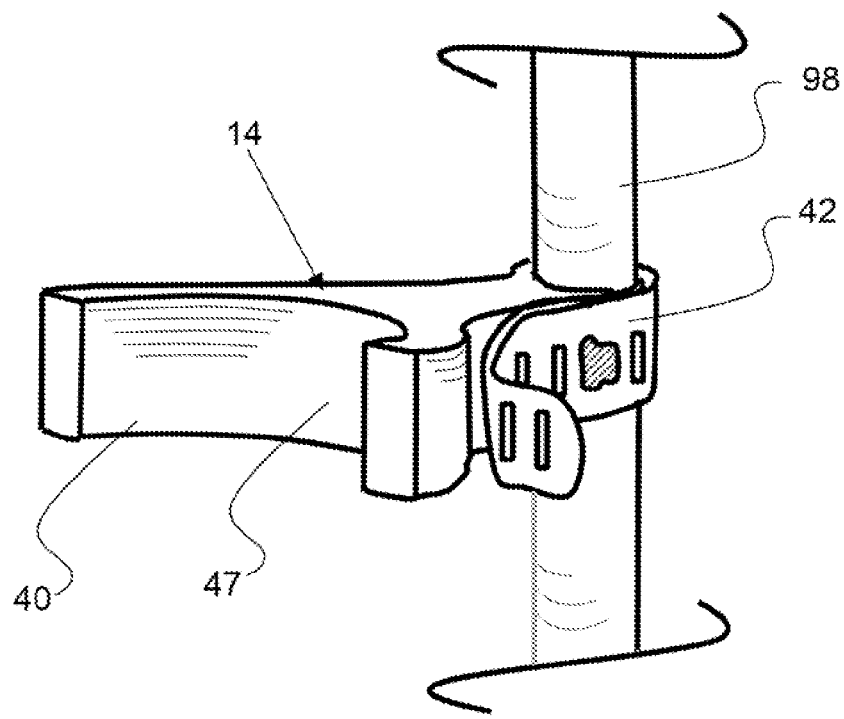

FIGS. 10A and 10B show a perspective views of exemplary mounting bracket having a charging feature.

Figure 11:
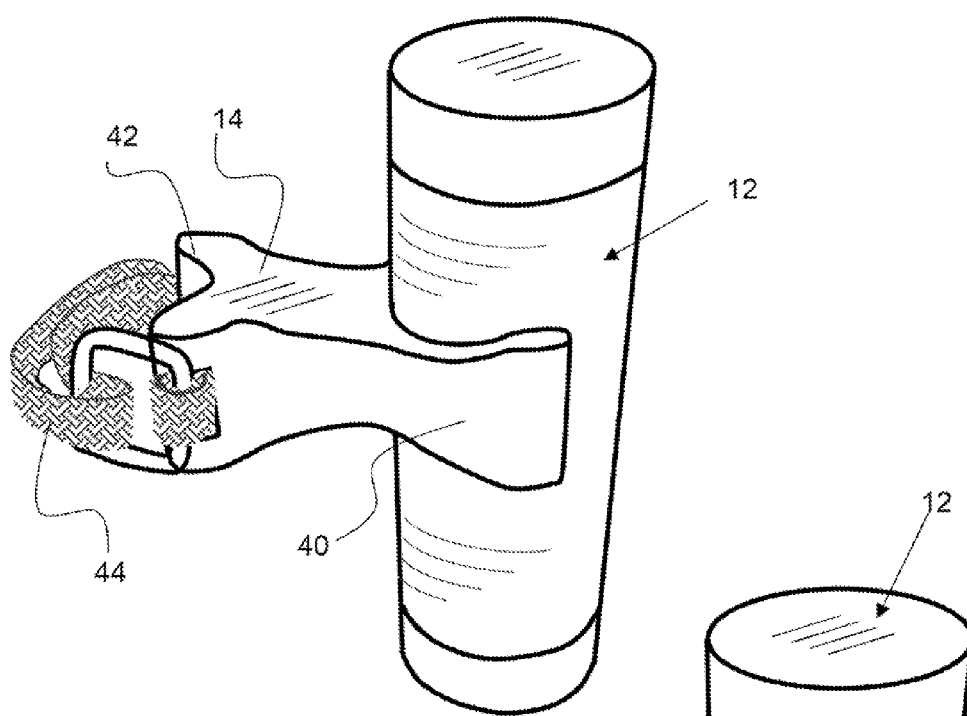

FIG. 11 shows a perspective view of an exemplary detachable portable light configured in an exemplary mounting bracket.

Figure 12:
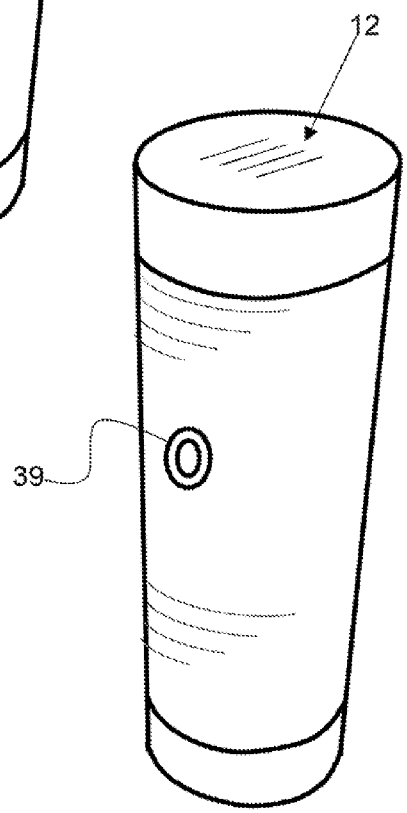

FIG. 12 shows a perspective view of an exemplary detachable portable light having a charging adapter.

Figure 13:
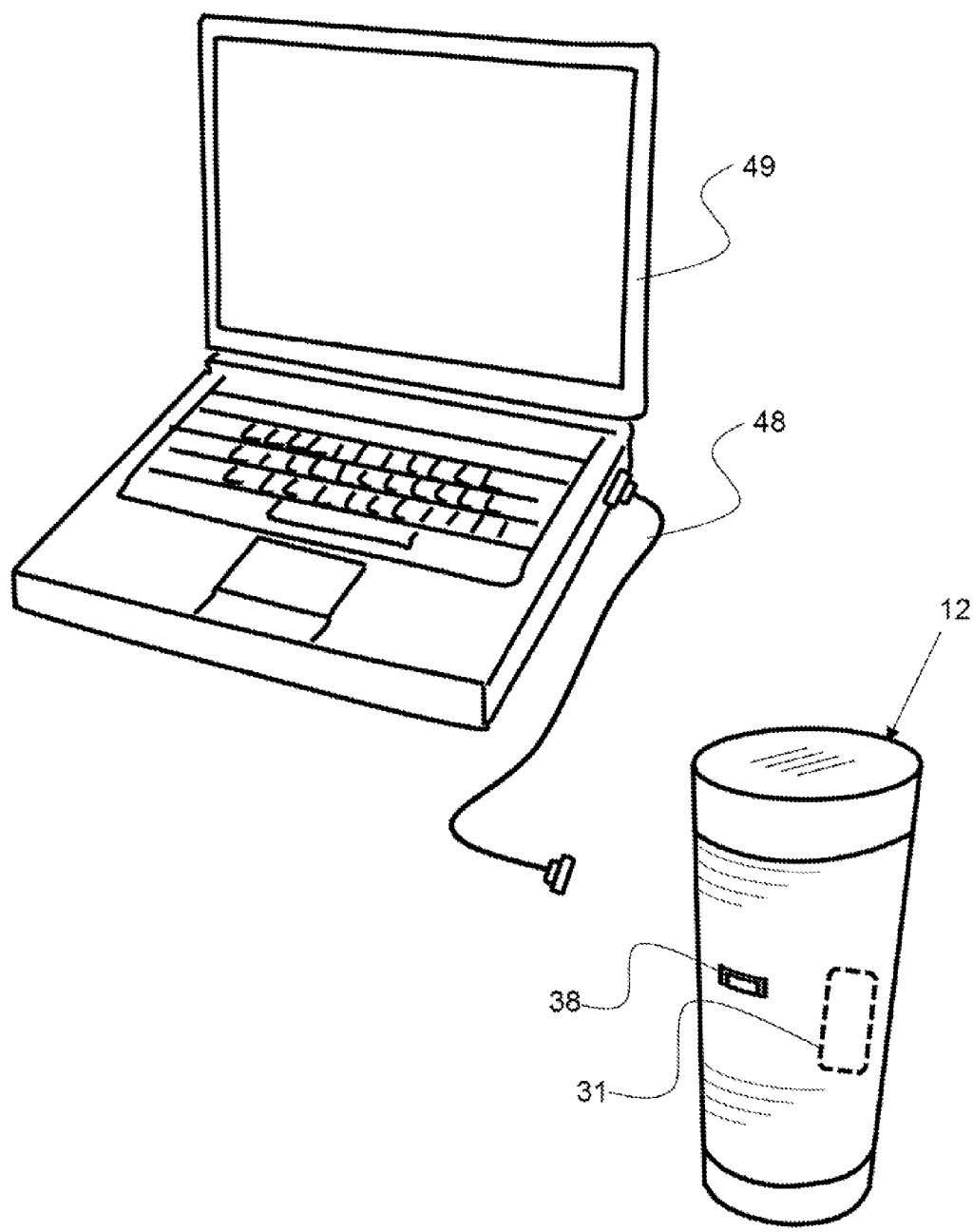

FIG. 13 shows a perspective view of an exemplary detachable portable light having a USB charging adapter.

Figure 14:
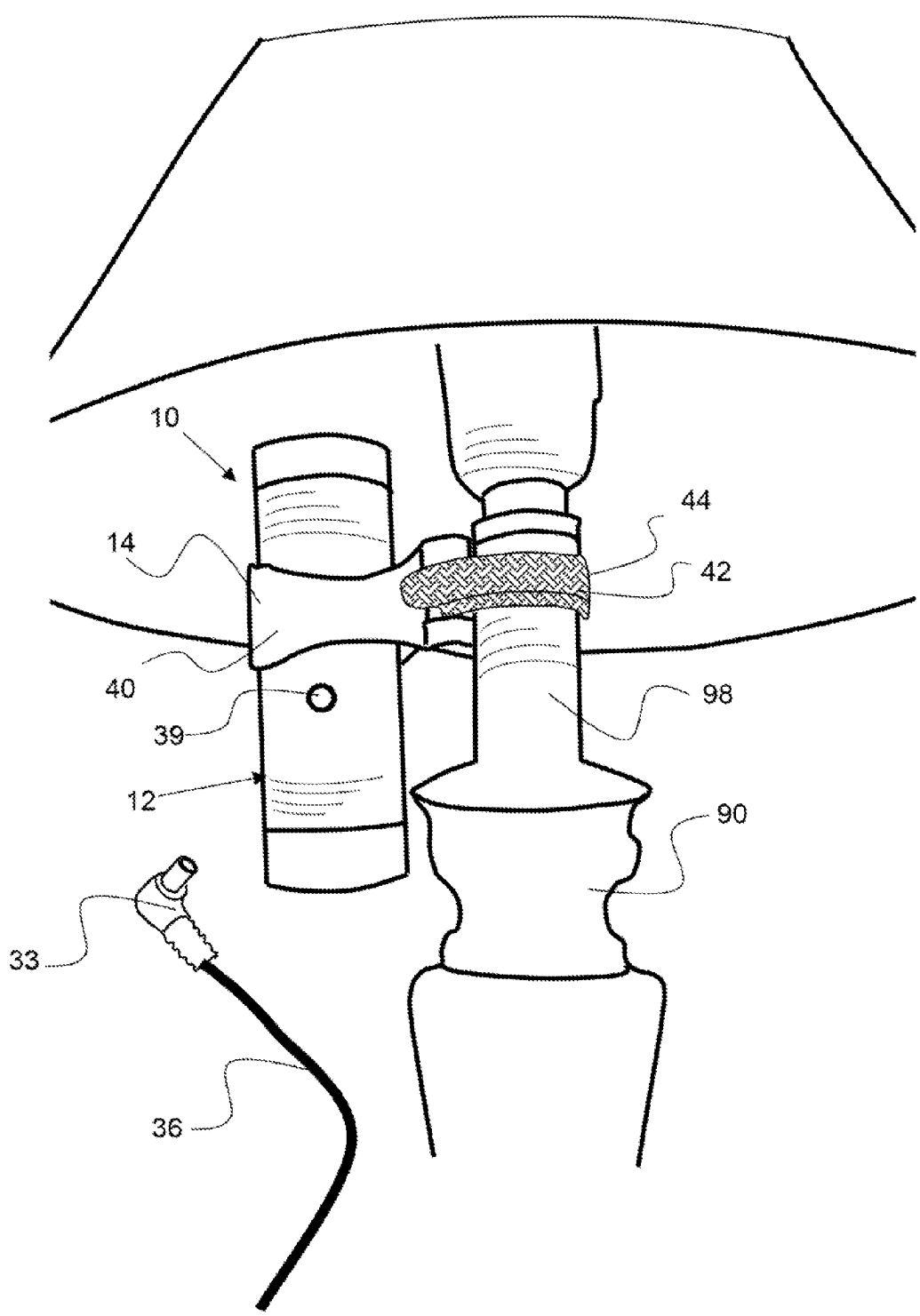

FIG. 14 shows a perspective view of an exemplary back-up lamp light system comprising a detachable portable light configured in a mounting bracket and attached to a lamp rod and a charger adapter configured to receive a right angle charging plug.

Figure 15:
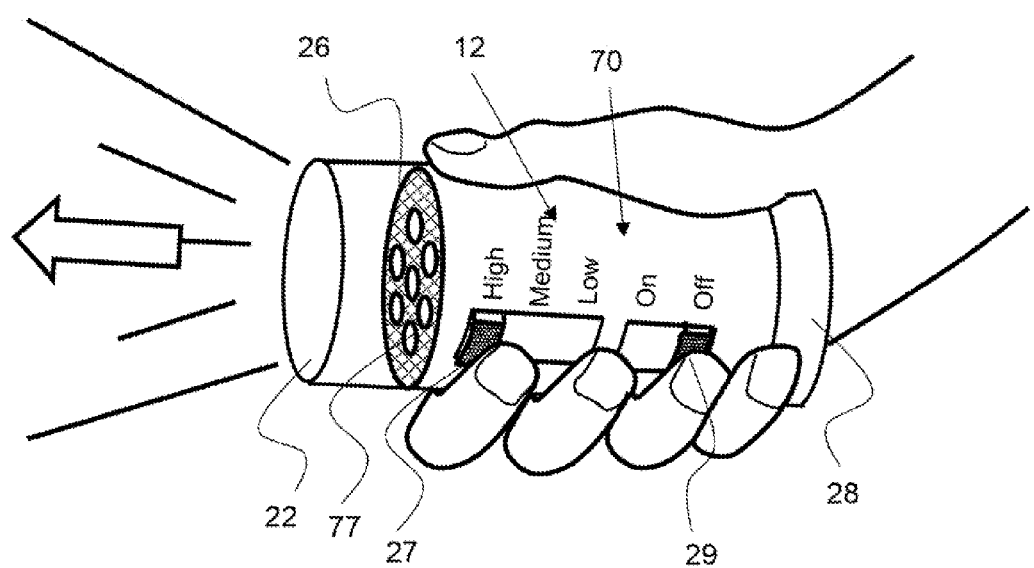

FIG. 15 shows a perspective view of an exemplary detachable portable light being used as a flashlight.

Figure 16:
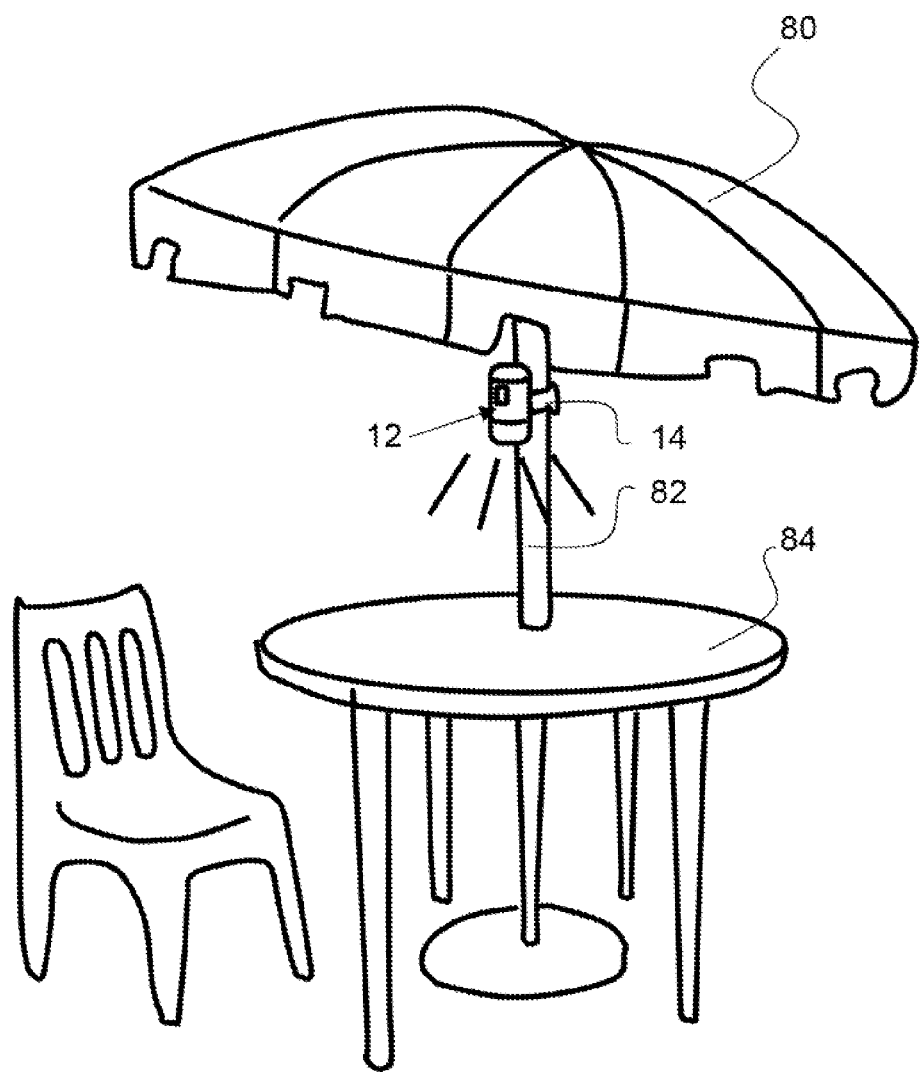

FIG. 16 shows a perspective view of an exemplary detachable portable light being used as a portable light element.

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications and improvements are within the scope of the present invention.

As shown in FIG. 1, an exemplary back-up lamp light system 10 comprises a detachable portable light 12 configured in a mounting bracket 14 that is attached to the rod 98 of the lamp 90. The portable light has a separate back-up power cord 36 that extends from the mounting bracket to the a first outlet 55. A back-up light plug 37 is plugged into one of the two outlets and a lamp power cord 96 terminates in a lamp plug 97 that is plugged into the second outlet 55'. The switch 100 is configured in an off position and the main light 26 of the portable light is on, as indicated by the light rays projecting from the main light. The main light is emitting light in a substantially upward direction or substantially from a first end of the portable light as indicated by the large arrow. A power source detector 16 configured on the portable light has detected a power outage and has automatically turned on the main light. A light sensor 30 is configured on the mounting bracket 14. The lamp light 92 is off and the light emitted from the main light may be reflected by the interior surface of the lampshade 94, thereby providing similar light to that of the lamp light when it is on. Most lampshades have a reflective or white interior surface that creates a diffuse reflectance of light. A portable light, as described herein, may be configured to emit a light into the lampshade 94.

As shown in FIG. 2, an exemplary back-up lamp light system 10 comprises a detachable portable light 12 configured in a mounting bracket 14 that is attached to the rod 98 of a lamp 90 and a charger module 34 that is plugged into an electrical outlet 55. A charger module may be any suitable electrical device that converts the power from an outlet to a suitable power for the portable light and/or a battery 31 of the portable light. The power source detector 16 and the light sensor 30 are configured proximal to the back-up light plug and on the charger module. In this embodiment, the switch 100 is in an on position but the lamp is not on because of a power outage and the nightlight 28 has been automatically activated. The back-up lamp light system 10, as shown in FIG. 2, is completely portable as it can be detached from the lamp and moved to a new location, such as to another lamp or to an umbrella post, for example.

As shown in FIG. 3, an exemplary integral back-up lamp light system 23 comprises a detachable portable light 12 configured in a mounting bracket 14 and a single electrical power cord 99 that extends within the interior of the lamp 90. The single power cord is plugged into an electrical outlet 55'. In this embodiment, the light switch 100 is in an on position, but the lamp light 92 is off because of a power outage. The power source detector 16 is configured in the mounting bracket and both the main light 26 and nightlight 28 have been automatically turned on. The power cord 99 may comprise two separate power lines that are coupled together to form a single cord over a portion of the length of the cord.

As shown in FIG. 4, an exemplary integral back-up lamp light system 23 comprises a detachable portable light 12 configured in a mounting bracket 14 and two distinct power cords 36, 96 are extending from the lamp. The back-up power cord 36 and the lamp power cord 96 both extend up through the interior of the lamp. The back-up power cord is coupled electrically with the portable light such as through the mounting bracket and the lamp power cord is coupled electrically with the lamp light 92. The lamp power cord 96 terminates in a lamp power plug 97 that is plugged into the bottom outlet 55'. The back-up power cord 36 terminates in a back-up light plug 37 that is plugged into the top outlet 55. In this embodiment, the switch 100 controls power to the bottom outlet 55' and thereby controls the function of the lamp. When the switch is on, the lamp light illuminates and when the switch is off, the lamp is turned off. The switch, in this embodiment, terminates power only to the outlet 55' when in an off position, therefore a back-up light plugged into this outlet would detect a power outage when the switch was turned off. The other outlet 55 is a hot outlet and therefore a separate back-up light plug is plugged into this outlet. In this embodiment, a power outage has occurred and the power source detector 16 has detected the outage and the nightlight has been automatically turned on. Note that the lamp power cord 96 terminates in a piggy back plug 35 that has a male plug portion that is plugged into the outlet and an outlet configured for insertion of another plug. In the event that the switch controls the outlet, but a voltage is still present in the outlet 55' with the switch in an off position, the back-up light plug 37 may be plugged into the piggy back plug 35. Any number of piggy back plugs may be configured on a back-up light plug, lamp power plug, or charger module, as described herein.

As shown in FIG. 5, an exemplary integral back-up lamp light system 23 comprises a detachable portable light 12 configured in a mounting bracket 14 and is attached to a lamp 90 substantially under the lampshade 94. Note that the integral back-up lamp light system is substantially hidden from view as it is configured within the lampshade.

As shown in FIG. 6, an exemplary detachable portable light 12 has a main light 26 and a nightlight 28 configured on opposing ends of the portable light and both a main light control 27 and nightlight control 29. The portable light is free standing as it can be set upright and will stay in an upright configuration. The main light is configured on a first end 22 and the nightlight is configured on a second end 24. The main light has a main light control that is a switch that can be moved from between high, medium, low and off. The intensity of the light emitted from the main light may be controlled by movement of the main light control switch 27. In an exemplary embodiment, the main light has a plurality of LED type lights and the low level light setting activates or turns-on one or more of the LEDs and the medium light level setting turns on additional LEDs and the high light level setting turns on all of the plurality of LEDs. The nightlight control has an on and off switch 29. It is to be understood that the main and/or nightlight may be automatically activated to come on regardless of their controller setting in the event of a power outage or when there is a low level of light. A circuit or controller 17 may be configured to automatically turn on one or more of the lights and bypass their setting in the event of a power outage. In addition, an auto control 72 may be configured on the portable light or any other suitable location to allow auto activation of one or more of the lights in the event of a low light detection by a light level sensor, as described herein. Function and control of the portable light may be controlled through suitable circuits and/or a processor.

As shown in FIG. 7, an exemplary detachable portable light 12 has a main light 26, a nightlight 28, and both a main light control switch 27 and nightlight control 29 that is a button. As described herein, a control button may be used to toggle through one or more settings of a light. Also shown in FIG. 7 is a light level input feature 66, that enables a user to set the level of light that activates the main light and/or nightlight to come on. A user may turn the light level input feature until one of the portable lights comes on, thereby setting the desired low level light threshold value.

As shown in FIG. 8, an exemplary detachable portable light 12 has a main light control 27 button and a nightlight control 29 switch. The main light control button may be used to toggle through main light level settings.

As shown in FIG. 9, an exemplary detachable portable light 12 has a main light 26, a nightlight 28 and both a main light control 27 button and nightlight control 29 button. A separate on/off switch 21 is also shown. In this embodiment, the on-off switch may be used to activate the portable light 12 and the separate controls for the two lights may be used to turn them on or off as desired. The main light may have two or more light level settings that can be activated by pressing the push button. One or more of the lights may be automatically turned in the event of a power outage regardless of the position of the light control settings or the position of the on/off control 21. A nightlight may have two or more light output level settings.

As shown in FIG. 10A, an exemplary mounting bracket 12 has a charging feature 46 that is configured to couple with a charger adapter of a portable light, not shown. The mounting bracket has a coupler portion 42 that is configured around a lamp rod 98 and a portable light retainer portion 40 that is configured to retain a portable light, as described herein. The portable light retainer portion 40 has a curved surface to accommodate a cylindrical portable light. The portable light retainer portion extends completely around the light rod, thereby forming an aperture for the rod to extend therethrough. A charging feature may be an inductive charger that is configured within the mounting bracket. An inductive charger would not require the alignment of a charging feature with a charging adapter on the portable light. A lamp rod 98 may be any portion of a lamp that extends up from a base to the lamp light and in most cases has a round or cylindrical outer shape.

As shown in FIG. 10B, an exemplary mounting bracket 12 has an inductive charging feature 47 that has not physical mating portion with a charger adapter of a portable light, as shown in FIG. 10A. In addition, the mounting bracket has a strap, such as an elastic material, that can be retained in any one of the fastener apertures as shown.

As shown in FIG. 11, an exemplary detachable portable light 12 is configured in an exemplary mounting bracket 14. The mounting bracket has a strap type fastener 44 that may comprise a buckle and/or snap and hook and loop fastener material.

As shown in FIG. 12, an exemplary detachable portable light 12 has a charging adapter 39 that is configured to couple with a charging feature of a mounting bracket.

As shown in FIG. 13, an exemplary detachable portable light 12 has a USB charging adapter 38. A USB charging adapter allows the rechargeable battery 31 of the portable light to be charged through the USB cable 48. A USB cable may be plugged into an electronic device, such as a laptop computer 49, as shown, or any other suitable USB connection, such as those in a wall outlet, in an automobile, and the like.

As shown in FIG. 14, an exemplary back-up lamp light system 10 comprises a detachable portable light 12 configured in a mounting bracket 14 and attached to a lamp rod 98. A charger adapter 39 is configured to receive a right angle charging plug 33 that is coupled with a back-up power cord 36. A right-angle power plug may enable easier manipulation of the portable light in the mounting bracket.

As shown in FIG. 15, an exemplary detachable portable light 23 is being used as a flashlight 70. The main light 26 is set to a high light level setting by the main light control 27 and the nightlight 28 is off. The main light is configured proximal to the first end 22 and comprises a plurality of LED lights 77. In this embodiment, all of the LED lights are turned on as the light level setting is in a high position. The light being emitted from the main light is substantially from the first end and substantially no light is being emitted from the second end. It is to be understood that some light may be emitted to the side of the portable light in this embodiment. However, substantially all of the light is being emitted out of the first end in the direction indicated by the large arrow.

As shown in FIG. 16, an exemplary detachable portable light 12 is being used as a portable light element. The mounting bracket 14 is attached to the umbrella rod 82. The portable light is configured with the main light in a down orientation, whereby a higher level of light than the nightlight is being emitted down onto the table 84. In an exemplary embodiment, the portable light may be configured in the mounting bracket in an up or down position. In an up position, the light may reflect off of the underside of the umbrella 80 to produce a more subtle light.

DEFINITIONS

A lamp, as used herein, is defined as a portable light source that is free standing having a base, an extension from said base, and can be moved from one location to another.

Electrically coupled, as used herein, means that electricity from one point is provided to another point or feature, such as from an outlet to the portable light. Any number of junctions or couplings may be within an electrical coupling, including charging modules, plugs, power cords, charging features, charging adapters, batteries and the like.

It will be apparent to those skilled in the art that various modifications, combinations and variations can be made in the present invention without departing from the spirit or scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. A back-up lamp light system comprising:
   a) a lamp comprising:
      a lamp light; and
      a lamp power cord having a lamp plug plugged into a first outlet to provide electrical power from the first outlet to the lamp light;
   b) mounting bracket couple to said lamp;
   c) a portable light configured to be detachably attachable to said mounting bracket and comprising:
      a main light;
      a nightlight;
   d) a back-up power cord electrically coupled to said portable light and having a back-up light plug that is plugged into a second outlet to provide electrical power from the second outlet to the portable light;
   e) a power source detector electrically coupled with said portable light; and
   f) a light sensor coupled with the portable light,
   whereby when said power source detector detects a power outage to the back-up light power plug, and when said light sensor detects a low level of light, at least one of said main light or said nightlight is configured to automatically turn on.

2. The back-up lamp light system of claim 1, wherein only said nightlight is configured to automatically turn on when said power source detector detects a power outage and when said light sensor detects a low level of light.

3. The back-up lamp light system of claim 1, wherein the portable light has a first end and a second end, whereby said main light is configured to emit light from said first end and said nightlight is configured to emit light from said second end.

4. The back-up lamp light system of claim 1, wherein the back-up lamp light system is an integral back-up lamp light system wherein said power cord extends through an interior of the lamp.

5. The back-up lamp light system of claim 1, comprising:
   a) a charging feature; and
   wherein the portable light comprises:
   b) a rechargeable battery configured to be charged by said charging feature.

6. The back-up lamp light system of claim 5, wherein the charging feature is configured in the mounting bracket, and wherein the portable light comprises a charger adapter that is configured to couple with said charging feature when said portable light is attached to said mounting bracket.

7. The back-up lamp light system of claim 5, wherein the charging feature is an inductive charger.

8. The back-up lamp light system of claim 1, wherein said back-up lamp light system is detachable from a lamp, whereby the mounting bracket, the power cord and portable light can all be removed from a lamp.

9. The back-up lamp light system of claim 1, comprising a USB adapter configured on the portable light.

10. The back-up lamp light system of claim 1, wherein the light sensor is configured on the mounting bracket.

11. The back-up lamp light system of claim 1, comprising a main light controller and wherein the main light has at least two light level output settings.

12. The back-up lamp light system of claim 11, wherein the main light controller comprises:
   a) a low control setting;
   b) a medium control setting; and
   c) a high light control setting.

13. The back-up lamp light system of claim 11, comprising a nightlight controller.

14. The back-up lamp light system of claim 1, wherein the portable light is configured to be used as a flashlight, wherein the portable light is cylindrical in shape and emits a light from one end of said portable light.

15. A back-up lamp light system comprising:
 a) a lamp comprising:
  a lamp light; and
  a lamp power cord having a lamp plug plugged into a first outlet to provide electrical power from the first outlet to the lamp light;
 b) a mounting bracket configured to couple to a lamp rod comprising:
  a portable light retainer portion;
 c) a portable light configured to be detachably attachable to said mounting bracket and comprising:
  a main light;
  a nightlight;
  a rechargeable battery;
 d) a back-up power cord electrically couple with said portable light and having a back-up light plug that is plugged into a second outlet to provide electrical power from the second outlet to the portable light;
 e) a charging feature electrically coupled with said portable light and said power cord; and
 f) a power source detector electrically coupled with said portable light;
 g) a light sensor coupled with the portable light,
 whereby when said power source detector detects a power outage to the back-up light power plug, and when said light sensor detects a low level of light, at least one of said main light or said nightlight is configured to automatically turn on;
 wherein the portable light has a first end and a second end, whereby said main light is configured to emit light from said first end
 wherein said rechargeable battery is configured to be electrically coupled with said charger feature to charge said rechargeable battery; and
 wherein said back-up lamp light system is detachable from a lamp, whereby the mounting bracket, the power cord and portable light can all be removed from a lamp.

16. The back-up lamp light system of claim 15, further comprising:
 a main light controller having at least two main light level output settings; and
 a nightlight controller configured to turn the nightlight on and off.

17. A method of providing back-up light in the event of a power outage comprising the steps of:
 a) providing a back-up lamp light system comprising:
  a lamp comprising:
   a lamp light; and
   a lamp power cord having a lamp plug plugged into a first outlet to provide electrical power from the first outlet to the lamp light;
  a mounting bracket configured to couple to a lamp rod comprising:
   a portable light retainer portion;
  a portable light configured to be detachably attachable to said mounting bracket and comprising:
   a main light,
   a nightlight;
   a rechargeable battery;
  a back-up power cord electrically coupled to said portable light and having a back-up light plug that is plugged into a second outlet to provide electrical power from the second outlet to said portable light;
  a charging feature coupled with said portable light and said power cord;
  a power source detector electrically coupled with said portable light;
  a light sensor,
 whereby when said power source detector detects a power outage to the back-up light power plug, at least one of said main light or said nightlight is configured to automatically turn on;
 wherein the portable light has a first end and a second end, whereby said main light is configured to emit light from said first end and said nightlight is configured to emit light from said second end; and
 wherein said rechargeable battery is configured to be electrically coupled with said charging feature to charge said rechargeable battery;
 b) mounting said portable light to said lamp rod with said mounting bracket;
 c) plugging said back-up light power plug into said second outlet;
 whereby when said power source detector detects a power outage to the back-up light power plug and when said light sensor detects a low level of light, at least one of said main light or said nightlight is configured to automatically turn on.

18. The method of providing back-up light in the event of a power outage of claim 17 further comprising the step of:
 a) providing a light control,
 b) setting said light control to a light output level,
 whereby, when the power source detector detects a power outage to the back-up light power plug, at least one of the main light or the nightlight is configured to automatically turn on to said light output level.

19. The back-up lamp light system of claim 1, wherein the portable light comprises a charging adaptor.

* * * * *